United States Patent
Zver et al.

(10) Patent No.: US 7,598,628 B2
(45) Date of Patent: Oct. 6, 2009

(54) AUTOMATED BYPASS METHOD AND APPARATUS

(75) Inventors: Ronald Zver, Lake Zurich, IL (US); Edward Smith, Trevor, WI (US); Donald Charles, Wauconda, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 1152 days.

(21) Appl. No.: 10/743,339

(22) Filed: Dec. 22, 2003

(65) Prior Publication Data

US 2005/0035664 A1 Feb. 17, 2005

Related U.S. Application Data

(60) Provisional application No. 60/435,107, filed on Dec. 20, 2002.

(51) Int. Cl.
*H01H 33/59* (2006.01)
*H01H 47/00* (2006.01)
(52) U.S. Cl. ..................................... 307/115
(58) Field of Classification Search ................ 307/115
See application file for complete search history.

(56) References Cited

U.S. PATENT DOCUMENTS 6,292,379 B1 * 9/2001 Edevold et al. ............... 363/71
6,923,285 B1 * 8/2005 Rossow et al. ............. 180/272

* cited by examiner

*Primary Examiner*—Fritz M Fleming
*Assistant Examiner*—Dru M Parries

(57) ABSTRACT

An arrangement that provides power to an electrical device includes an inverter, first and second switches, and a bypass controller. The first switch has open and closed positions, and is operable to connect the inverter to the electrical device when in the closed position. The second switch has open and closed positions, and is operable to connect a utility power line source to the electrical device when in the closed position. The bypass controller is operable to cause a transition sequence in which the first switch changes to the open position and the second switch changes to the closed position. The bypass controller is further operable to: cause continuous actuation of a first indicator when the first switch is closed; cause continuous actuation of a second indicator when the second switch is closed; and cause intermittent actuation of the second indicator during at least part of the transition sequence.

16 Claims, 9 Drawing Sheets

AUTOMATED BYPASS METHOD AND APPARATUS

This application claims the benefit of U.S. Provisional Patent Application Ser. No. 60/435,107, filed Dec. 20, 2002, which is incorporated herein by reference.

FIELD OF THE INVENTION

The present invention relates generally to systems that provide power to electrical equipment, and more particularly, to systems that provide electrical power from multiple alternative sources to electrical equipment.

BACKGROUND OF THE INVENTION

Certain types of electrical equipment, for example, motors and other devices, can be configured to receive electrical power from multiple alternate sources. One common configuration is an AC motor that is powered by either the utility AC power lines, or by a variable frequency drive. In common applications, the variable frequency drive is used as a primary source of electrical power because it can be used to vary the speed of an AC synchronous motor. However, utility AC power is provided as a back-up in the event that the variable frequency drive has a fault or otherwise should not be used.

In such situations, it has been a common practice to employ bypass relays and circuits that operate to connect the variable frequency drive to the input of the motor (or other electrical equipment) during normal operation, and then disconnect the variable frequency drive and connect the utility AC power to the input of the motor under certain "bypass" conditions. Examples of bypass conditions include a fault in the variable frequency drive, or an emergency condition in the building or facility in which the motor is disposed. The bypass operation may be triggered automatically, as by detection of an overload condition or the like within the variable frequency drive, or triggered manually, as by a pushbutton or other type of switch.

Early bypass systems were hardware intensive, and provided little or no intuitive information as to their operation to an observer. Sometimes little or no indication was provided as to the state of various system relays. Because of the lack of information, it could be difficult determining how the bypass system was operating, much less why the system was in a particular state or mode. Moreover, the electrical circuits of the early bypass systems required a relatively large number of assembled parts and provided limited functionality.

More recently, bypass systems have increasingly employed electronic circuit to address some of the drawbacks discussed above. For example, U.S. Pat. No. 6,316,896 to Karl Tikkanen et al. shows a bypass system that includes a variable frequency drive, and which includes a pushbutton interface and automated bypass operation. The push button interface also identifies the status of the output relays (AC power or variable frequency drive) and thus provides an indication of the source of power that is being provided to the electrical load. The device employs a microcontroller, which to some degree allows for enhanced functionality.

While the device described in U.S. Pat. No. 6,316,896 provides some additional functionality and status information, there is a need for further information regarding the operation of a bypass device. There is also a need for a bypass device that has a reduced part count in relation to the functionality provided.

SUMMARY OF THE INVENTION

The present invention addresses at least some of the above needs, and in certain embodiments addresses many of the above needs, in an arrangement for providing alternate sources of energy to an electrical device, the arrangement displaying different configurations of indicators representative of different states of operation of the arrangement, and at least another configuration of indicators representative of a condition in which the arrangement is between active states. Other embodiments improve cost by implementing an arrangement in which an inverter is deactivated before the inverter is disconnected from the load. By deactivating the inverter first, the contacts of the switch that disconnects the inverter would require less current passing/breaking capability.

A first embodiment of the invention is an arrangement for use in providing power to an electrical device that includes an inverter, a first switch, a second switch, and a bypass controller. The first switch has an open position and a closed position, and is operably coupled to connect the inverter to the electrical device when the first switch is in the closed position. The second switch has an open position and a closed position, and is operably coupled to connect a utility power line source to the electrical device when the second switch is in the closed position. The bypass controller is operable to cause a first transition sequence in which the first switch changes to the open position and subsequently the second switch changes to the closed position. The bypass controller is further operable to: cause continuous actuation of a first indicator when the first switch is in the closed position; cause continuous actuation of a second indicator when the second switch is in the closed position; and cause intermittent actuation of the second indicator during at least a portion of the first transition sequence.

A second embodiment of the invention is a bypass circuit that includes a first switch, a second switch and a processing circuit. The bypass circuit is designed for use in an arrangement for use in providing power to an electrical device, the arrangement including an inverter. The first switch has an open position and a closed position and is operably coupled to connect the inverter to the electrical device when the first switch is in the closed position. The second switch has an open position and a closed position, and is operably coupled to connect a utility power line source to the electrical device when the second switch is in the closed position. The processing circuit is operable to cause a first transition sequence in which the first switch changes to the open position and subsequently the second switch changes to the closed position. The bypass controller is further operable to provide a signal to the inverter to cause the inverter to cease providing output prior to first switch changing to the open position.

The above described features and advantages, as well as others, will become more readily apparent to those of ordinary skill in the art by reference to the following detailed description and accompanying drawings.

DETAILED DESCRIPTION

Figure 1:
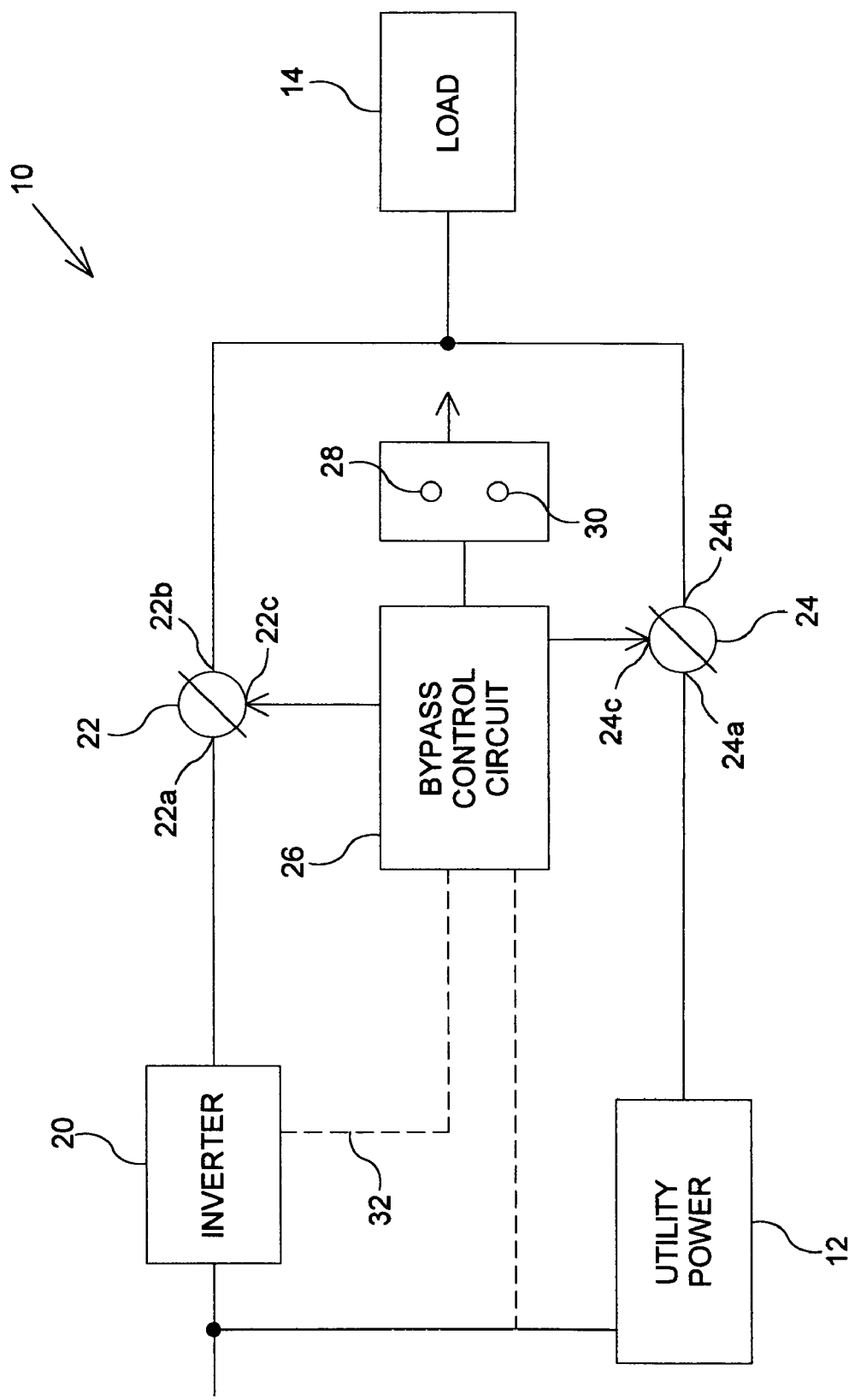
FIG. 1 shows a block schematic diagram of an arrangement for providing alternative sources of power to an electrical device according to the invention shown in context with a source of utility power and a load.

FIG. 1 illustrates an exemplary arrangement 10 for providing alternative sources of power to a load according to aspects of the invention. The arrangement 10 is shown in context with a source of utility power 12 and a load 14. The arrangement 10 includes an inverter 20, a first switch 22, a second switch 24, a bypass control circuit 26, and first and second indicators 28 and 30, respectively. In general, the arrangement 10 selectively provides a connection between utility power 12 and the load 14 in some circumstances and provides a connection between the inverter 20 and the load 14 in other circumstances. The arrangement 10 also provides information regarding the current condition of the elements of the arrangement 10 using the first and second indicators 28 and 30.

By way of example, the load 14 may be a synchronous AC machine that operates in conjunction with the frequency of the AC input power signal. While the load 14 may operate from the AC power from the utility power line, the variability of speed of an AC machine is limited when the source of power is the utility power line. In order to provide for more speed variability, the load 14 is coupled to the inverter 20, which is preferably a variable frequency drive. In such an arrangement, the inverter 20 provides power to the load 14 under normal conditions, which allows for speed adjustment of the load 14 through variance of the inverter 20 output frequency. However, under certain conditions, such as a malfunction or other fault in the inverter 20, or an emergency condition, the arrangement 10 cause causes the load 14 to be powered from the utility power 12, even though it provides less flexibility.

To accomplish the above described functionality, the elements of the arrangement are configured as set forth below. As discussed above, the inverter 20 is a device that is operable to generate an inverter output capable of powering the load 14. To this end, the inverter 20 may suitably be a variable frequency drive which provides power to the load 14, wherein the load 14 is a synchronous AC machine.

The first switch 22 is a circuit element that has first and second contacts 22a, 22b, and includes a control input 22c. The first switch 22 has an open position and a closed position. In the open position, the first and second contacts 22a and 22b are disconnected electrically. In the closed position, the first and second contacts 22a and 22b are connected electrically. The first switch 22 is operable to switch between the open position and the closed position responsive to signals on the control input 22c.

In one embodiment, the first switch 22 is a relay and the first and second contacts 22a and 22b are relay output contacts. However, other suitable high power switch circuits and/or elements may be used.

In any event, the first contact 22a is coupled to the inverter 20 and the second contact 22b is coupled to the load 14. The control input 22c is operably coupled to receive control signals from the bypass control circuit 26.

The second switch 24 similarly has first and second contacts 24a, 24b, and includes a control input 24c. The second switch 24 has an open position and a closed position and may suitably have the same construction as the first switch 22. The first contact 24a is coupled to the utility power 12 and the second contact 24b is coupled to the load 14. The control input 24c is operably coupled to receive control signals from the bypass control circuit 26.

The bypass control circuit 26 is a circuit that includes a logic device such as a microprocessor, microcontroller, and/or discrete components capable of carrying out the logical operations described herein. The bypass control circuit 26 may also include driver circuits that convert digital logic signals to signals capable of controlling the switches 22 and 24. For example, if the switches 22 and 24 are relays, then the bypass control circuit 26 may include driver circuits operable to provide relay logic level signals.

The bypass control circuit 26 is operable to cause a first transition sequence in which the first switch 22 changes from the closed position to the open position, and, subsequently, the second switch 24 changes from the open position to the closed position. To this end, the bypass control circuit 26 sequentially provides a signal condition to the first switch control input 22c that causes the first switch 22 to be in the open position and then provides a signal condition to the second switch control input 24c that causes the second switch 24 to be in the closed position.

The bypass control circuit 26 is further operable to cause continuous actuation of the first indicator 28 when the first switch 22 is in the closed position, and cause continuous actuation of the second indicator 30 when the second switch 24 is in the closed position. The bypass control circuit 26 is further operable to cause intermittent actuation of the second indicator 30 during at least a portion of the first transition sequence, preferably after the first switch 22 changes to the open position and before the second switch 24 changes to the closed position.

The bypass control circuit 26 is preferably also operable to effectuate other transition sequences. For example, another transition sequence may be a sequence in which the second switch 24 is changed to the open position and the first switch 22 is changed to the closed position. The bypass control circuit 26 may also be operable to cause intermittent actuation of the first indicator 28 during this second transition sequence.

Referring now to the general operation of the arrangement 10, during normal operations, the inverter 20 provides power to the load 14. In particular, the bypass control circuit 26 causes the first switch 22 to be in the open position and causes the second switch 24 to be in the closed position. When the first switch 22 is closed, the inverter 20 provides the inverter output to the load 14. If a condition requiring cessation of the inverter output is detected, the bypass control circuit 26 initiates the first transition sequence. The detection of the condition may be automatically done within the inverter 20 and communicated to the bypass control circuit 26 via the status connection 32. Alternatively, the detection of the condition may be done manually by an operator, in which case the bypass control circuit 26 may suitably receive a bypass command signal via a human actuated device, not shown.

Once the first transition sequence is initiated, the bypass control circuit 26 provides a signal to the second indicator 30 that causes the second indicator 30 to be actuated intermittently (i.e. blinking). The blinking second indicator 30 provides to a human operator a notification that the arrangement 10 is changing states, and that the pending state is changing to utility power.

The bypass control circuit 26 also provides a signal condition to the first switch control input 22c that causes the first switch 22 to be in the open position. Responsive to this signal condition, the first switch 22 disconnects the first contact 22a from the second contact 22b. As a consequence, the inverter 20 is disconnected from the load 14. At about the same time, the bypass control circuit 26 causes de-actuation of the first indicator 28.

In preferred embodiments, the inverter 20 stops providing the inverter output prior to the first switch 22 changing to the open position. To this end, the bypass control circuit 26 may provide a signal to the inverter 20 that causes the inverter 20 to stop providing inverter output. One advantage of stopping the inverter output prior to disconnection of the contacts 22a and 22b is that the contacts 22a and 22b may be of a lower power switching capability. In particular, if the contacts 22a and 22b are disconnected at full inverter output power, then the contacts 22a and 22b must be of sufficient current passing/switching capacity to break a connection at the full output power of the inverter 20. By contrast, when the contacts 22a and 22b are disconnected after the inverter 20 stops generating output power, the contacts 22a and 22b may be contacts specified to a lower current passing capability because they are not breaking a connection at full inverter output power.

In any event, once the switch contacts 22a and 22b are open, then the bypass control circuit 26 provides a signal condition to the second switch control input 24c that causes the second switch 24 to change to the closed position. Once the second switch 24 changes to the closed position, the switch contacts 24a and 24b are connected. As a consequence, utility power 12 is connected to the load 14. At about the same time, the bypass control circuit 26 provides a signal that causes continuous actuation of the second indicator 30.

After some time, it may be safe and/or desirable to transition back to inverter power. The bypass control circuit 26 is preferably operable to perform steps similar to those described above in order to transition from the provision of utility power via the second switch 24 to provision of inverter power via the first switch 22 when conditions are appropriate. In such case, the bypass control circuit 26 would cause intermittent actuation of the first indicator 28 during the transition.

The arrangement 10 described above to thus operates to transition between a state in which the load 14 receives power from the inverter 20 and a state in which the load 14 receives power from the utility power lines 12. Moreover, the indicators 28 and 30 under the control of the bypass control circuit 26 provide an indication of the current state of the arrangement 10, as well as state transition information. In particular, table 1 shows the relationship between configuration of the indicators 28 and 30 and the state/transition of the arrangement 10.

TABLE I

| State or Transition | Ind 28 | Ind 30 |
|---|---|---|
| Inverter Power | On | Off |
| Utility Power | Off | On |

TABLE I-continued

| State or Transition | Ind 28 | Ind 30 |
|---|---|---|
| Util Pwr Pending | Off | Blink |
| Inv Pwr Pending | Blink | Off |

It is noted that the arrangement 10 may suitably have other states, such as those relating to safety operations and other conditions known in the art. The specific details of such other states is omitted for clarity of exposition of the invention, and may vary from arrangement to arrangement without departing from the principles of the invention.

In addition, it will be appreciated that other configurations of indicators may be used, as long as there are distinct indicator configurations that correspond to different operational states as well as at least one distinct configuration for at least one transition condition. Thus, in other embodiments, an indicator need not necessarily be actuated intermittently to indicate a transition from one state to another. In such other embodiments, a unique combination of continuously actuated indicators, or a dedicated indicator, may instead be used to indicate a transition between states of operation of the arrangement 10. However, the use of a blinking indicator as described herein provides further advantages of intuitively communicating the existence of a transient condition. Moreover, intermittent actuation of the same indicator that will eventually be continuously actuated after the transition provides further intuitive information representative of the pending state of the arrangement 10.

Figure 2:
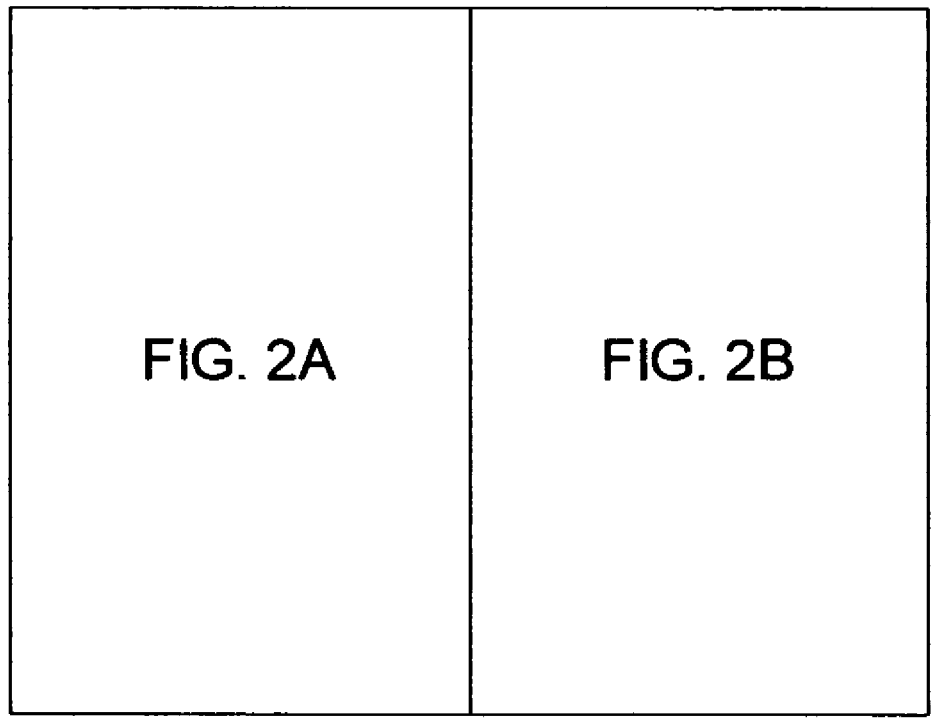
FIG. 2 shows a detailed block diagram of an arrangement for providing alternative sources of power to a load that constitutes one exemplary embodiment of the arrangement of FIG. 1.
Figure 2A:
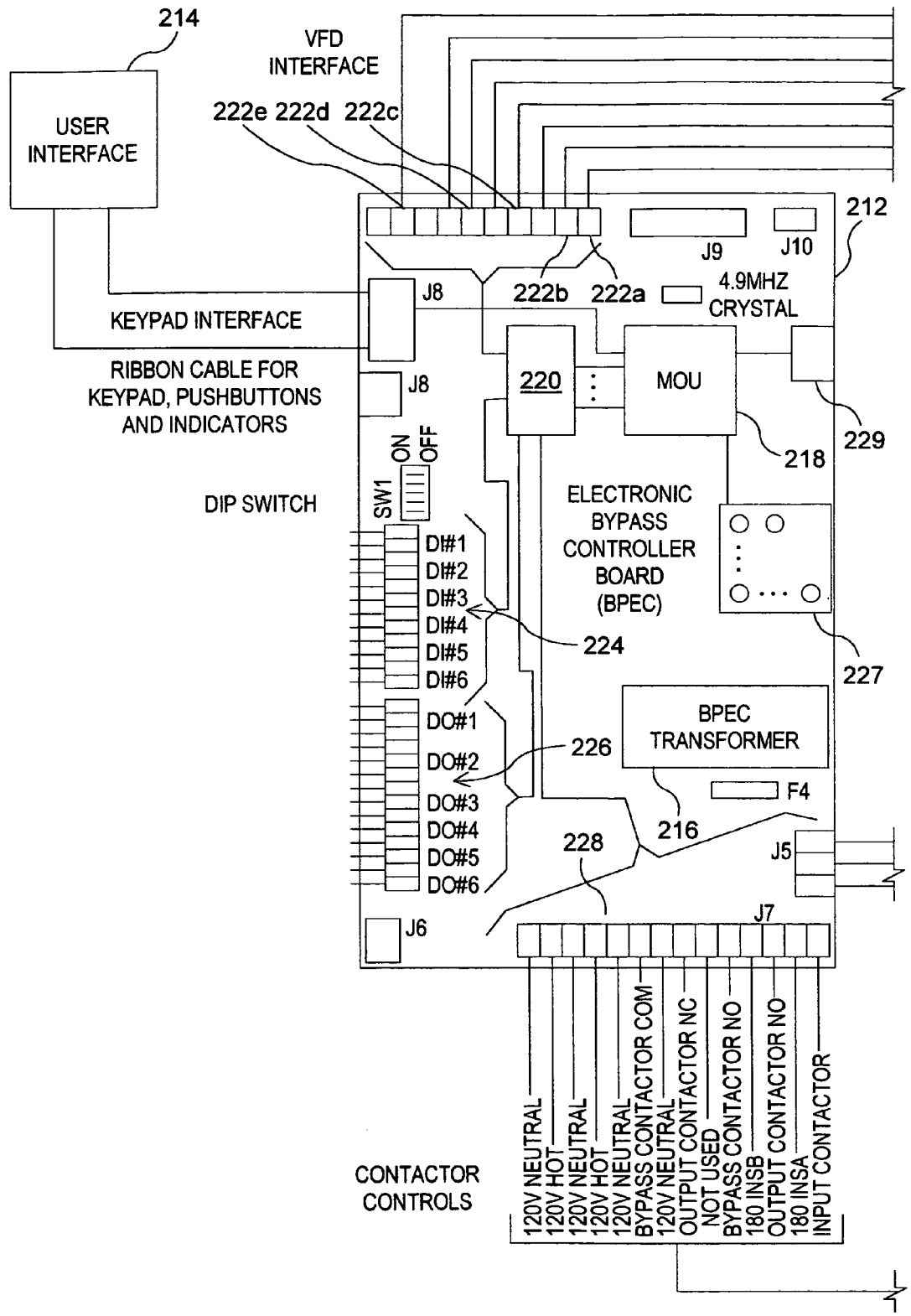
Figure 2B:
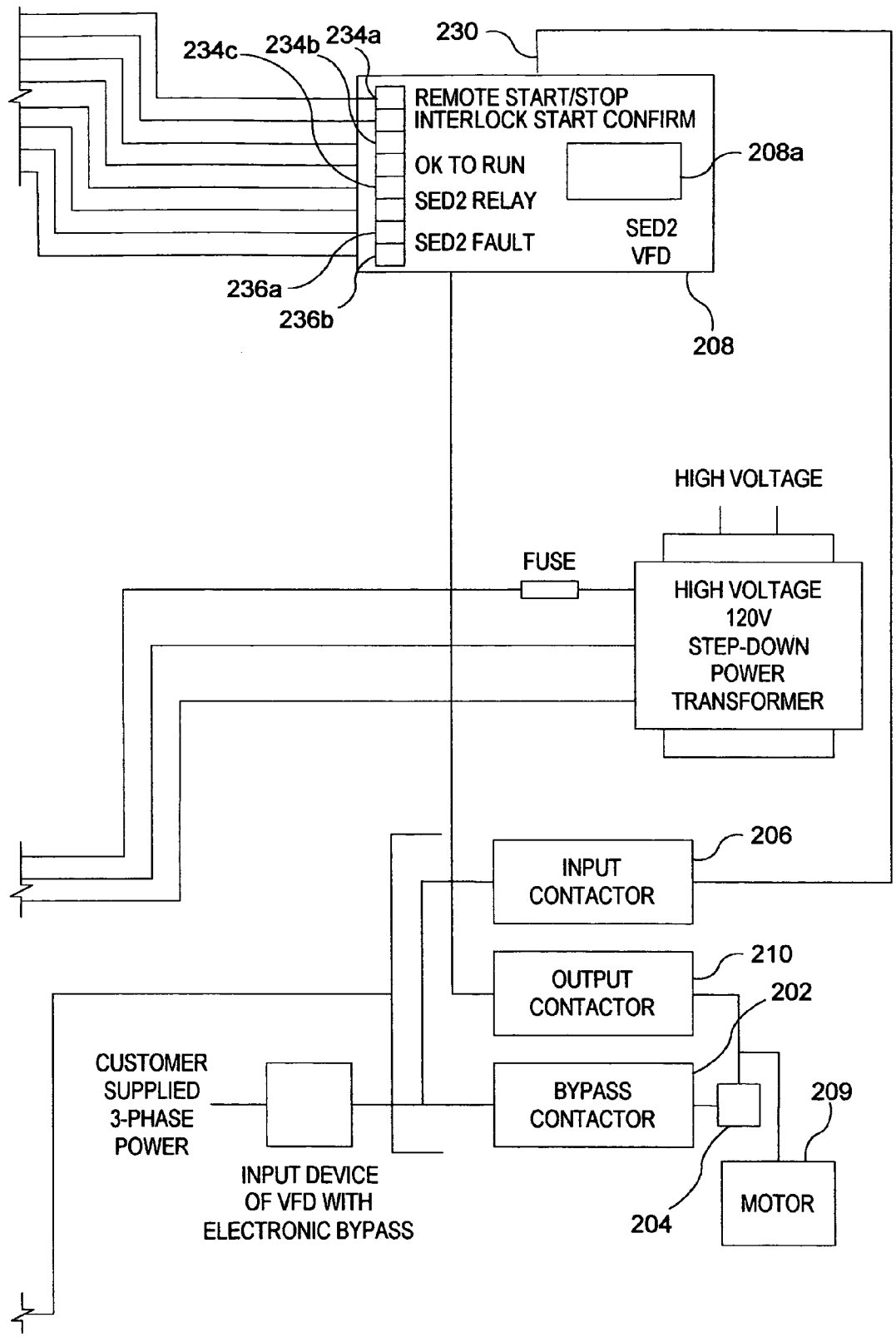
Figure 3:
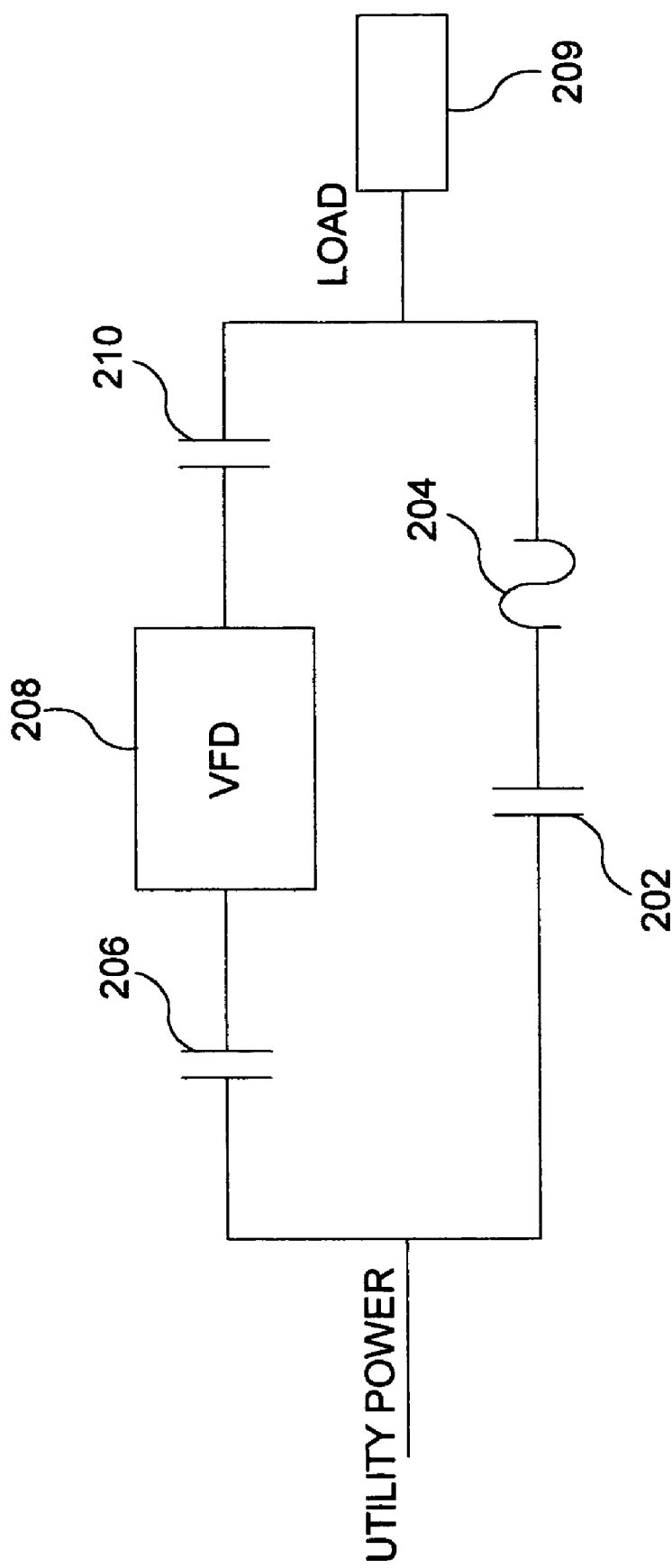
FIG. 3 shows a general schematic block diagram of the switching portions of the arrangement of FIG. 2.

FIG. 2 shows a block diagram of an arrangement 200 for providing alternative sources of power to a load 209 that constitutes one exemplary embodiment of the arrangement 10 of FIG. 1. FIG. 3 shows a general block diagram of the switching elements of the arrangement 200. Referring to FIGS. 2 and 3, the arrangement 200 includes a bypass relay contact 202, an overload relay contact 204, an input relay contact 206, a variable frequency drive 208 and an output relay contact 210. The bypass relay contact 202 and the overload relay 204 are series connected between the utility power lines and the load 209. The input relay contact 206 is connected between the utility power lines and the variable frequency drive 208 and the output relay contact 210 is connected between the variable frequency drive 208 and the load 209. In the exemplary embodiment shown in FIG. 2, the load 209 is a motor and will be referred to as such. However, it will be appreciated that the load 209 may suitable another type of synchronous AC machine in which the frequency of the drive frequency may be varied to achieve flexible operation.

Referring again to FIG. 2, the arrangement 200 further includes a bypass control circuit 212 and a user interface 214. The user interface 214 is shown in further detail in FIG. 4, and is discussed in detail further below. The bypass control circuit 212 includes a power supply circuit 216, a main processor circuit 218, a set of I/O drivers 220, a set of variable frequency drive ("VFD") I/O ports 222a-222e, a set of digital inputs 224, a set of digital outputs 226, a set of relay connections 228, and may further include a communication port 229. The main processor circuit 218 is operably connected to communicate signals through each of the ports 222a-222e, inputs 224, outputs 226 and connections 228 through the set of I/O drivers 220. The main processor circuit 218 is also coupled to the user interface 214 and is operable to receive input therefrom and provide output thereto.

In the embodiment described herein, the main processor circuit 218 includes a MC68HC908AB32 model microprocessor available from Motorola, Inc. (www.motorola.com). The set of I/O drivers 220 are circuits or circuit elements that convert digital signals that are compatible with the main processor circuit 218 to signals that are communicated through the various connected I/O elements 222a-222e, 224, 226 and 228. For example, several I/O elements including the VFD I/O ports 222a-222e, the digital inputs 224, the digital outputs 226 and the relay connections 228 communicate signals using relay logic signals. Relay logic often employs AC signals having a relatively high voltage level (24 VAC or 120 VAC). Driver circuits 220 operable to interface between microprocessor voltage levels and relay logic voltage levels are well known in the art.

The communication port 229 is any suitable circuit operable to effect communications between the main processor 218 and external devices over a digital communication link. To this end, for example, the communication port 229 may comprise an RS-232 transceiver or the like. The communication port 229 allows for configuration programming and setup, for example, during manufacturing or commissioning. Such configuration programming and/or set up may suitably include programming of unique identifiers for factory and/or customer use, manufacturing date and product revision or update. The communication port 229 may also enable further communications with the variable frequency drive's digital communication port or enable communication with the building control system. Communication with the building control system would allow, for example, remote control of whether or not certain functionality is enabled, such as automatic bypass, interlock start, or essential services.

The bypass control circuit 212 further preferably includes a set of status LEDs 227 or other indicators that are used for diagnostics of the bypass control circuit 212. For example, under normal operation, one LED of the set of status LEDs 227 may blink to indicate that normal operations are occurring. Under a detected diagnostic error of the bypass control circuit 212, the set of status LEDs 227 may adopt a unique configuration corresponding to the particular error detected. By configuration of the indicators, it is meant the combination of actuated, unactuated and intermittently actuated states of the various LEDs.

The variable frequency drive 208 is a device that is operable to provide a variable frequency AC power output to an AC machine such as the motor 209. In particular, the variable frequency drive 208 receives three-phase AC utility power at a constant frequency and provides a controllable frequency AC signal as an output. By way of example, the variable frequency drive 208 may be the model SED2 variable frequency drive available from Siemens Building Technologies, Inc., of Buffalo Grove, Ill. In the exemplary embodiment described herein, the variable frequency drive 208 includes a user interface 208a, a utility power input 230, a VFD output 232, three signal inputs 234a, 234b and 234c, and two signal outputs 236a, 236b. The utility power input 230 is connected to three-phase utility power via the input relay contact 206. The VFD output 232 is connected to the output relay contact 210.

The three signal inputs 234a, 234b and 234c, as well as the two signal outputs 236a, 236b, are connected to the VFD I/O ports 222a-222e of the bypass control circuit 212. The variable frequency drive 208 may further include data ports or the like, not shown, which enable other data inputs and programming of features within the variable frequency drive 208. Such other inputs and programming features will vary from application to application and would be known to those of ordinary skill in the art. For example, the data ports may be coupled to an integrated building control system that controls various aspects of a building's heating, ventilation and air conditioning system.

Figure 4:
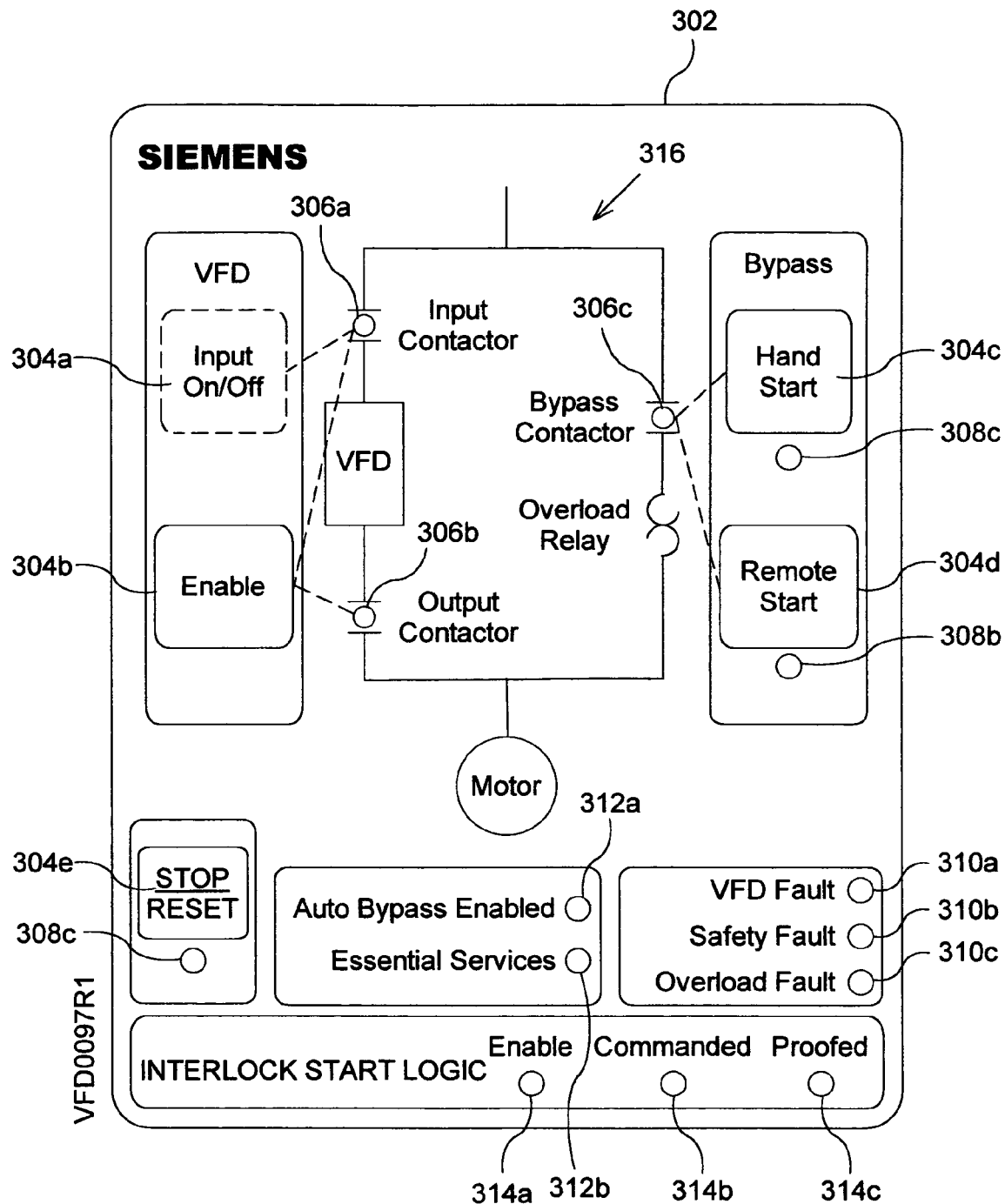
FIG. 4 shows a top plan view of the user interface of the arrangement of FIG. 3.

The user interface 214 is shown in plan view in FIG. 4. The user interface 214 includes a top panel 302 on which are disposed a number of membrane switches 304a-304e, openings through which LED indicators 306a-306c, 308a-308c, 310a-310c, 312a-312b, and 314a-314c are visible, and indicia next to many of the indicators and on many of the membrane switches 304a-304e.

The top panel 302 further includes schematic indicia 316 in the form of a schematic representation of the circuit shown in FIG. 3. The schematic indicia 316 includes representations of the relay contacts 202, 206, 210, the overload relay 204, and the variable frequency drive 208, along with verbal indicia of the location of those elements within the schematic representation. Visible at appropriate locations in the schematic indicia 316 is an input contact LED indicator 306a, an output contact LED indicator 306b, and a bypass contact LED indicator 306c. By "appropriate locations", it is meant that the indicators 306a-306c are visible through top panel at locations in the schematic indicia 316 at which the relays corresponding to the indicators 306a-306c are connected. The schematic indicia 316 further includes a representation of the load 209.

The membrane actuator 304a is operably coupled to the bypass control circuit 212 to provide a signal representative of a user request to open or close the input relay contact 206. The membrane actuator 304b is operably coupled to the bypass control circuit 212 to provide a signal representative of a user request to close the relay contacts 206 and 210.

Figure 6:
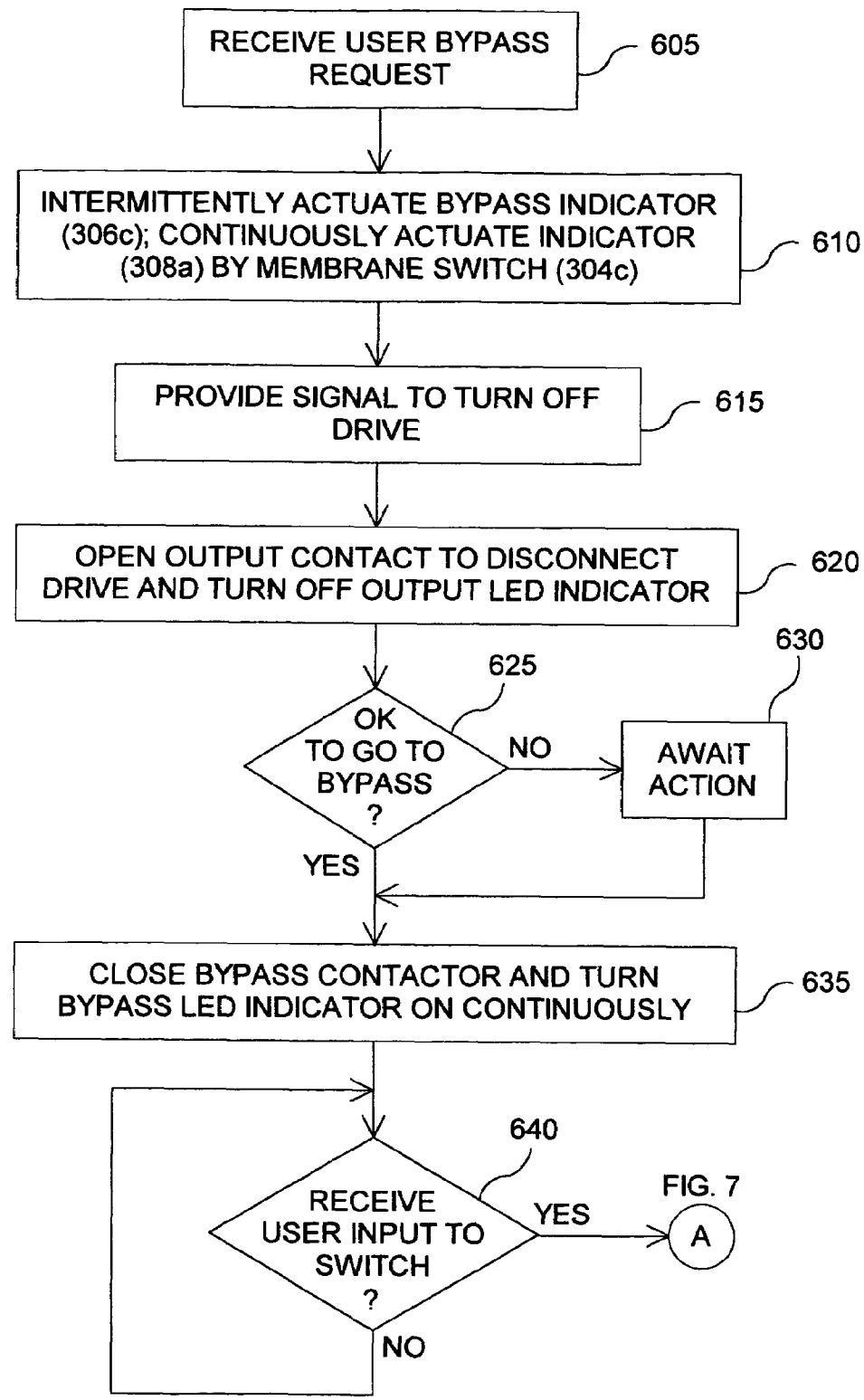
FIG. 6 shows a second set of operations performed by the processor of the arrangement of FIG. 3 during a transition from the first operational mode to the second operational mode.

The membrane actuator 304c is operably coupled to the bypass control circuit 212 to provide a signal representative of a user request to go into bypass operation (i.e. cause the output relay contact 210 to open and bypass relay contact 202 to close, as discussed further below in connection with FIG. 6). The LED indicator 308a is operably coupled to the bypass control circuit 212 to receive a signal representative of the user request to enter bypass operation via membrane actuator 304c.

The membrane actuator 304d is operably coupled to the bypass control circuit 212 to provide a signal representative of a user request to enable remote commands to go into bypass operation. The LED indicator 308b is operably coupled to the bypass control circuit 212 to receive a signal representative of the user request via membrane actuator 304d.

The membrane actuator 304e is operably coupled to the bypass control circuit 212 to provide a signal representative of a user request to stop providing power to the load and/or reset the bypass control circuit 212. The LED indicator 308c is operably coupled to the bypass control circuit 212 to receive a signal representative of the user request via membrane actuator 304e.

Each of the LED indicators 310a-310c is operably coupled to the bypass control circuit 212 to receive a signal representative of the existence of a particular kind of fault. The LED indicator 312a is operably coupled to the bypass control circuit 212 to receive a signal representative of a state in which the automatic bypass operation (i.e. transitioning into bypass without human intervention, as discussed below in connection with FIG. 5) has been enabled. Each of the LED indicators 312b and 314a-314c relate to other operations of the arrangement 200 which are beyond the scope of the invention but which would be known to those of ordinary skill in the art. Such other operations include an "essential services" mode or state which allows for transition to bypass mode operation under emergency conditions. Such other operations also include an "interlock start logic" mode that creates additional safeguards upon start-up of the arrangement.

In the general operation of the arrangement 200, the motor 209 is provided power from the variable frequency drive 208. Motor speed may be changed through the variable frequency drive interface 208a or through signals received from communication ports, not shown, of the variable frequency drive 208. Signals determining the speed of the motor 209 may be generated by a building control system or the like.

Figure 5:
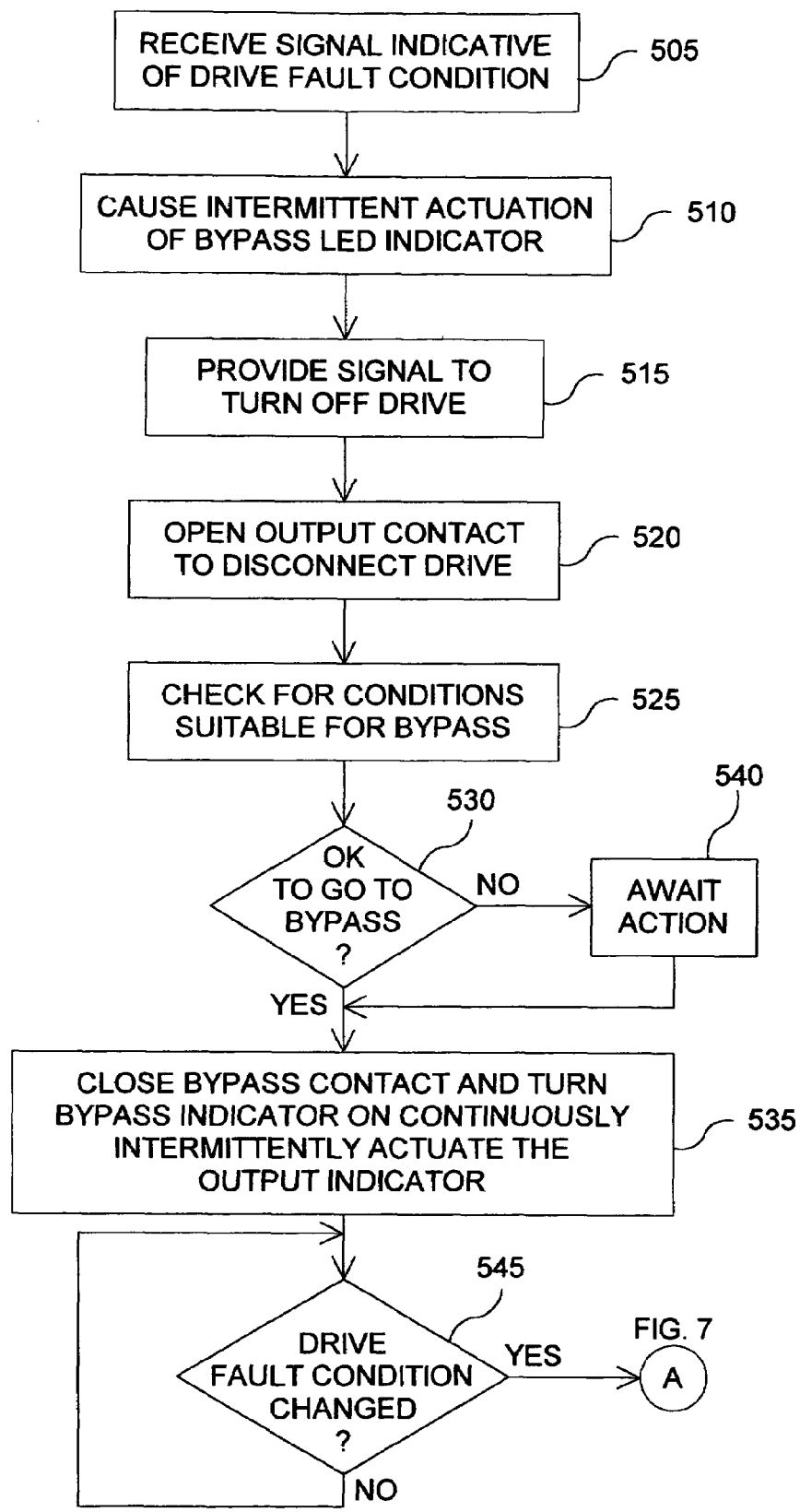
FIG. 5 shows a first set of operations performed by a processor of the arrangement of FIG. 3 during a transition from a first operational mode to a second operational mode.

During the operation of the variable frequency drive 208, a condition may occur that requires or otherwise recommends going into bypass mode operation. Bypass mode operation is the state in which the variable frequency drive 208 no longer provides power to the motor 209 and the motor 209 instead is powered by the utility power through the bypass relay contact 202. Conditions that can result in bypass operations include overcurrent or overvoltage as detected in the variable frequency drive 208, or elsewhere. Commercially available variable frequency drives are typically capable of generating an external indication or signal that identifies that the drive should not operate. Other conditions may include an emergency condition detected by the building control system, not shown. FIG. 5, discussed below, provides a set of operations that may be performed when bypass mode operations are automatically triggered by a detected condition in the variable frequency drive 208 or elsewhere.

By contrast, other conditions that can cause a transition into bypass mode operations are those triggered by user input. For example, the user may actuate the membrane actuator 304c on the user interface 214, or a remote signal to enter bypass mode operations may be received from the building control system via the digital inputs 224. FIG. 6 shows a set of operations that may be performed when bypass mode operations are manually requested by an operator.

Referring now to FIG. 5, an example of the operations of the bypass control circuit 212 transitioning into the bypass mode operations responsive to an automatically detected abnormal condition is shown. More specifically, FIG. 5 shows the operations of the main processor 218 of the bypass control circuit 212 during the transition from VFD mode operation (in which the motor 209 receives power from the variable frequency drive 208) to bypass mode operation (in which the motor 209 receives power from the utility power source). During normal VFD mode operation, the output LED indicator 306b is actuated and the bypass LED indicator 306c is de-actuated. Moreover, if the variable frequency drive 208 is providing power to the motor 209 in a steady state condition, then no faults are present and thus none of the fault LED indicators 310a, 310b, or 310c will be actuated. The LED indicator 312a will be actuated if auto-bypass has been enabled by the user.

In step 505, the main control processor 218 receives a signal or signals indicating that a condition exists, referred to herein as a drive fault condition, that requires an attempted transition to bypass mode operation. Such signals may be generated by equipment that measures current and/or voltage, or which receives overload information from the variable frequency drive 208, or the motor 209. In the embodiment described herein, such signals may be received by one or more of the digital inputs 224. Alternatively, such a signal may be received from the variable frequency drive 208 itself using an output relay 236b of the variable frequency drive 208, or some other output signal from the variable frequency drive 208. In any event, in order for the drive fault condition signals to cause a transition to bypass mode operations, automatic bypass operation must have been previously enabled.

The automatic bypass operation is enabled via one of the digital inputs 224, or through a DIP switch 219 connected to the main processor 218. As discussed above, the LED indicator 312a will be actuated if automatic bypass operation has been enabled.

If, therefore, the automatic bypass operation is enabled and the processor 218 receives a signal indicative of a drive fault condition, then the processor proceeds to step 510. In step 510, the processor cause the bypass LED indicator 306c to be intermittently actuated. This provides a visible indication that bypass mode operation is pending.

Thereafter, in step 515, the processor 218 provides a signal to the variable frequency drive 208 that causes the variable frequency drive 208 to stop producing an output at its output connection 232. In the embodiment described herein, such signal is a state change on the relay output 222c, which is received at the input 234c of the variable frequency drive 208.

In step 520, the processor 218 causes the output contactor 210 to open. At the time the output contactor is open 210, the drive 208 has already ceased providing power to the motor 209. However, the output contactor 210 must nevertheless be opened to prevent utility power from flowing back through the output 232 of the drive 208 during bypass mode operations.

In step 525, the processor 218 checks various conditions to determine whether bypass mode operation may be commenced. To this end, the processor 218 determines whether any of the digital inputs 224 reflect an overload condition, or other condition that inhibits bypass mode operation. In the exemplary embodiment described herein, a condition that prevents bypass mode operations is an overload detected on the utility power line or elsewhere. Such conditions may be detected by other elements of the building control system, not shown, which communicate information to the processor 218 via the digital inputs 224.

In step 530, if the processor 218 determines that no conditions exist that prevent the commencement of bypass mode operation, then the processor 218 proceeds to step 535. If the processor 218 instead determines that certain conditions exist (e.g. overload) that prevent going into bypass mode operation, then the processor 218 proceeds to step 540.

In step 540 (bypass mode operation not allowed), the processor 218 takes no further action. The processor 218 then causes an appropriate LED indicator of the user interface 214 to be actuated. For example, in the case of an overload fault, then the processor 218 causes the overload LED indicator 310c to be actuated. In some embodiments, the processor 218 causes the bypass LED indicator 306c to continue to be intermittently actuated to indicate that the arrangement 200 was attempting to go into bypass mode operation but could not proceed. Such a state persists until the processor 218 receives a signal indicating that the condition inhibiting the transition into bypass mode operation has been corrected, at which time the processor 218 proceeds to step 535.

In step 535 (bypass mode operations permitted), the processor 218 causes the bypass contactor 202 to close, thereby closing the circuit between the utility power and the motor 209. The motor 209 then operates using utility AC power. At about the same time, the processor 218 causes the bypass LED indicator 306c to be continuously actuated, instead of intermittently actuated. The continuous actuation of the bypass LED indicator 306c informs the human operator that bypass mode operations are in effect.

In a preferred embodiment, the processor 218 also causes the output LED indicator 306b to be intermittently actuated at this point, signifying that the arrangement 200 is "involuntarily" in bypass mode operation, i.e. as a result of a detected drive fault condition, and not the result of a user input. The intermittent actuation of the output LED indicator 306b provides a signal to the user that the current bypass mode operation was an automatically generated corrective action, and but for the drive fault condition, the arrangement 200 would be in normal VFD mode operation.

Thereafter, in step 545, during ongoing bypass mode operation, the processor 218 may receive information indicating that the drive fault condition has been corrected or removed. If so, then the processor 218 transitions back from bypass mode operation to VFD mode operation using the operation described below in connection with FIG. 7. If not, however, then the processor 218 continues with bypass mode operation and awaits correction of the drive fault conditions at step 545.

As discussed above, bypass mode operation may also be manually activated. In particular, a user or operator may select bypass mode operations via the membrane actuator 304c, or through remote selection via the digital inputs 224. FIG. 6 shows the operations of the bypass control circuit 212 in the event of a user-generated request to transition from VFD mode operations to bypass mode operation.

In step 605, the main control processor 218 receives a signal or signals indicating that bypass operation has been requested. In particular, one set of signals indicating a user request to transition to bypass mode operations are received from the user interface 214, for example, the membrane actuator 304c. In other words, the user may simply provide a direct command to transition to bypass via the actuator 304c.

Once signals indicative of a user request to transition into bypass mode operations are received in step 605, the processor proceeds to step 610. In step 610, the processor cause the bypass LED indicator 306c to be intermittently actuated. This provides a visible indication that bypass mode operation is pending.

Thereafter, in step 615, the processor 218 provides a signal to the variable frequency drive 208 that causes the variable frequency drive 208 to stop producing an output at its output connection 232. In the embodiment described herein, such signal is a state change on the relay output 222c.

In step 620, the processor 218 causes the output contactor 210 to open, similar to step 520 of FIG. 5. At about the same time, the processor 218 causes the output LED indicator 306b to be de-actuated, or in other words, turned off.

In step 625, the processor 218 checks various conditions to determine whether bypass mode operation may be commenced, similar to step 525 of FIG. 5. In step 625, if the processor 218 determines that no conditions exist that prevent the commencement of bypass mode operation, then the processor 218 proceeds to step 635. If the processor 218 instead determines that certain conditions exist (e.g. overload) that prevent going into bypass mode operation, then the processor 218 proceeds to step 630.

In step 630 (bypass mode operations not allowed), the processor 218 takes no further action. The processor 218 then causes an appropriate LED indicator to be actuated. As with step 540, in some embodiments, the processor 218 causes the bypass LED indicator 306c to continue to be intermittently actuated to indicate that the arrangement 200 was attempting to go into bypass mode operation but could not proceed. Such a state persists until the processor 218 receives a signal indicating that the condition inhibiting the transition into bypass mode operation is corrected, at which time the processor 218 proceeds to step 635.

In step 635 (bypass mode operations permitted), the processor 218 causes the bypass contactor 202 to close, thereby closing the circuit between the utility power and the motor 209. The motor 209 then operates using utility AC power. At about the same time, the processor 218 causes the bypass LED indicator 306c to be continuous actuated, instead of intermittently actuated. The continuous actuation of the bypass LED indicator 306c informs the human operator that bypass mode operation is in effect.

In a preferred embodiment, the processor 218 does not cause the output LED indicator 306b to be intermittently actuated, as was the case in step 535, because the bypass mode operation was not the result of a detected drive fault condition, but rather the result of a voluntary decision by the operator. In other words, VFD mode operation is not inhibited by some detected drive fault condition.

Thereafter, in step 640, during ongoing bypass mode operation, the processor 218 awaits user input requesting a transition from bypass mode operation back to VFD mode operation. To this end, the processor 218 awaits a signal indicative of actuation of the membrane actuator 304b, labeled "enable". If such a user request is received, then the processor 218 transitions back from bypass mode operation to VFD mode operation using the operation described below in connection with FIG. 7. If not, however, then the processor 218 continues with bypass mode operation and awaits a user request to transition in step 640.

Figure 7:
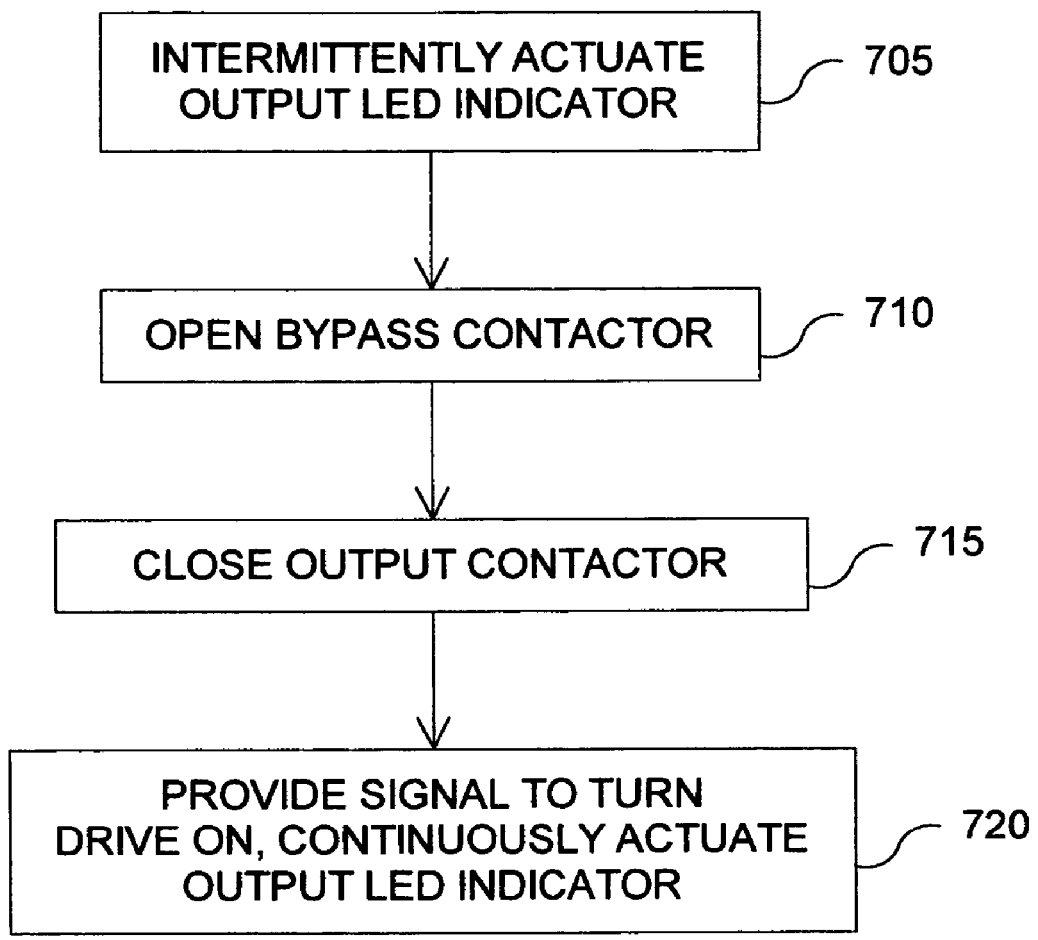
FIG. 7 shows a set of operations performed by a processor of the arrangement of FIG. 3 during a transition from the second operational mode to the first operational mode.

FIG. 7 shows a set of operations performed to return to VFD mode operation from bypass mode operation when conditions are appropriate. Such conditions are described above in connection with step 545 of FIG. 5 and step 640 of FIG. 6. The operations of FIG. 7 presume that the decision to return to VFD mode operation has already been made by the processor 218.

In step 705, the processor 218 causes intermittent actuation of the output LED indicator 306b of the top panel 302 user interface 214. The processor 218 then, in step 710, opens the bypass contactor 202, thereby disconnecting the utility power from the motor 209. At about the same time, the processor 218 causes the bypass LED indicator 306c to be de-actuated.

The processor 218 then, in step 715, closes the output contact 210. After step 715, the processor 218 proceeds to step 720. In step 720, the processor 218 provides a signal to the variable frequency drive 208 that causes the variable frequency drive to begin providing output power at the output 232. The processor 218 further causes the output LED indicator 306b to be continuously actuated.

In general reference to both bypass mode and VFD mode operations, the processor 218 may from time to time receive a signal indicating the existence of a safety fault through one of the inputs 224. Such signals may be generated by a building control system, for example. A safety fault may be generated if a technician is working on or near the motor 209, such as, by example, an interlock switch on a door to a cabinet which provides access to the motor 209.

If a signal indicative of a safety fault is received, then the processor 218 causes both of the contactors 202 and 210 to be open. The processor 218 also causes the LED indicators corresponding to the most recent state to be intermittently actuated. For example, if the arrangement 200 was in VFD mode operation at the time the fault was detected, then the processor 218 causes the output LED indicator 306b to be intermittently actuated. If, however, the arrangement 200 was in bypass mode operation when the fault was detected, then the processor 218 causes the bypass LED indicator 306c to be intermittently actuated. In either event, the processor 218 also causes the safety fault LED indicator 310b to be actuated. By blinking the LED indicators corresponding to the most recent operating state, the processor 218 and the user interface 214 cooperate to provide information regarding the operational state of the arrangement 200 prior to the safety fault.

It will be appreciated that the above embodiment also avoids switching the full variable frequency drive output energy through the output contact 210. In particular, as illustrated by the sequence of steps 515 and 520 and the sequence of steps 615 and 620, the processor 218 causes the variable frequency drive 208 to stop producing output prior to opening the output contact 210. Similarly, as illustrated by the sequence of steps 715 and 720, the processor 218 causes the output contact 210 to close prior to causing the variable frequency drive 208 to start producing output. Because of the arrangement 200 requires reduced power required to be switched, the output contact 210 may be of reduced size and/or power switching capacity, thereby reducing costs.

The above described embodiments are merely exemplary, and those of ordinary skill in the art may readily devise their own adaptations and implementations that incorporate the principles of the present invention and fall within the spirit and scope thereof. For example, it will be appreciated that the visible indicators in any of the embodiments described herein need not be LEDs, but could be another type of visible indicator such as portions of an LCD display or other type of display.

We claim:

1. An arrangement for use in providing power to an electrical device, the arrangement comprising:
   a) an inverter generating an inverter output;
   b) a first switch having an open position and a closed position, the first switch operably coupled to connect the inverter to the electrical device when the first switch is in the closed position;
   c) a second switch having an open position and a closed position, the second switch operably coupled to connect a utility power line source to the electrical device when the second switch is in the closed position;
   d) a bypass controller operable to cause a first transition sequence in which the first switch changes to the open position and subsequently the second switch changes to the closed position, the bypass controller further operable to:
      cause continuous actuation of a first indicator when the first switch is in the closed position;
      cause continuous actuation of a second indicator when the second switch is in the closed position; and
      cause intermittent actuation of the second indicator during at least a portion of the first transition sequence.

2. The arrangement of claim 1, wherein the first and second indicators are light emitting diodes.

3. The arrangement of claim 1, wherein the bypass controller causes continuous actuation of the first indicator at all times in which the first switch is in the closed position.

4. The arrangement of claim 3, wherein the bypass controller causes intermittent actuation of the second indicator only when the first switch is in the open position.

5. The arrangement of claim 1, wherein the bypass controller is further operable to cause the inverter to discontinue generating the inverter output during the first transition sequence and before causing the first switch to change to the open position.

6. The arrangement of claim 1, wherein the first transition sequence includes a portion in which the bypass controller obtains information regarding operation of the arrangement while the first switch is in the open position and the second switch is in the open position.

7. The arrangement of claim 1, wherein the inverter includes a variable frequency drive.

8. The arrangement of claim 1, wherein the bypass controller is operable to initiate the first transition sequence responsive to a signal indicative of an overcurrent condition in the inverter.

9. The arrangement of claim 1, wherein the bypass controller is operable to initiate the first transition sequence responsive to a signal generated by actuation of a user input.

10. An arrangement for providing a visible display corresponding to the operation of a system for providing alternative sources of power to an electrical device, the system having a plurality of states including a utility power bypass state and an inverter power state, the arrangement comprising a plurality of indicators and a processing circuit, the processing circuit operable to:
    cause a first visible configuration of the plurality of indicators when the arrangement is in the inverter power state;
    cause a second visible configuration of the plurality of indicators when the arrangement is in the utility power bypass state;
    cause a third visible configuration of the plurality of indicators when the arrangement at least a portion of the time when the arrangement is in transition between the inverter power state and the utility power bypass state.

11. The arrangement of claim 10 further comprising indicia proximate one or more of the plurality of indicators, and wherein the first visible configuration includes a first indicator in an actuated state, the first indicator disposed proximate indicia corresponding to the inverter power state.

12. The arrangement of claim 11 wherein the second visible configuration includes a second indicator in an actuated state, the second indicator disposed proximate indicia corresponding to the utility power bypass state.

13. The arrangement of claim 10 wherein the third visible configuration includes an intermittently actuated indicator.

14. The arrangement of claim 11 wherein the third visible configuration includes the first indicator in an intermittently actuated state.

15. The arrangement of claim 12 wherein the third visible configuration includes the second indicator in an intermittently actuated state.

16. The arrangement of claim 10 wherein the plurality of indicators comprise a plurality of light emitting diodes.

* * * * *